United States Patent Office 3,340,006
Patented Sept. 5, 1967

3,340,006
METHOD OF PRODUCING THIN FLAKES
OF METAL OXIDE
John M. Mochel, Painted Post, N.Y., assignor to Corning
Glass Works, Corning, N.Y., a corporation of New
York
No Drawing. Filed May 1, 1963, Ser. No. 277,101
6 Claims. (Cl. 23—144)

This invention relates to the production of thin flakes. In particular, this invention relates to a method of forming metal oxides into thin flakes of predetermined thickness.

It is known that the electrical and optical properties of metal oxides can be altered by forming the material as a thin film. Many metal oxides are found to be transparent to visible light when formed as thin films. Through the use of thin film application techniques, additives may be readily incorporated into a parent material to alter its electrical or optical properties.

I have now found a method for producing particles of metal oxides possessing properties heretofore obtainable only in thin films of metal oxides.

The principal object of this invention, therefore, is to provide a method for the preparation of metal oxides in the form of very thin flakes of predetermined thickness.

It is a further object to provide a method of producing material in particulate form having the desirable properties found in thin films.

These and other objects are accomplished in accordance with the present invention by forming a thin film of metal oxide on a substrate body, the substrate body being selectively soluble with respect to the metal oxide film, removing the substrate body by contact with a solvent and recovering the metal oxide in the form of thin flakes.

The method of the present invention is broadly applicable to any metal oxide which can be formed as a thin film on a substrate provided that the thin film material is sufficiently durable to resist the solvent necessary to remove the substrate and is sufficiently brittle to break into flakes when removed. For example, metal oxides such as $TiO_2$, $In_2O_3$, $Ta_2O_5$, $ZrO_2$ and $SnO_2$ may be used. They are well suited for application by thin film techniques, and the film properties of these materials have been found particularly useful in electronics and optical applications. For example, tin oxide, although normally a poor conductor, becomes a relatively good electrical conductor when applied in the form of a thin film, doped with an additive such as antimony, fluorine, phosphorus or boron. By the method of the present invention, it is possible to obtain particulate forms of tin oxide containing a doping material substantially uniformly distributed throughout. Tin oxide flakes prepared in this manner may be incorporated in a glassy matrix to form an electrically conductive glass article.

It is known that metal oxides may be formed in thin films which display iridescence caused by optical interference phenomena. Such "iridized" films are frequently applied to the surface of glass and glazed ceramic articles for their decorative effect. The present invention makes it possible to obtain iridescense in a flake form of the material. These flakes may be embedded in a glass or plastic matrix to produce a desirable decorative effect.

The method of the present invention is particularly useful for the formation of metal oxide flakes having a thickness of less than 25,000 A. Such extremely thin flakes are difficult to form by the conventional methods that have heretofore been employed in the production of larger flakes.

In forming a thin film for purposes of the present invention, any of the known techniques may be utilized. For example, thin films may be formed by spraying, sputtering, vapor deposition, etc. Controlled or predetermined thickness of the final flakes may be achieved by controlling the thickness of the film. I have found that a particularly effective practice in this respect is the well-known iridizing process wherein an atmosphere containing vapors or an atomized mist of an organic compound, such as an alkoxide or actyl acetonate or halogen compound, of the metal is brought in contact with a heated substrate to form a metal oxide film. Control of flake thickness may be accomplished by controlling the rate of atomization or by controlling dilution of the film-forming solution.

A more detailed discussion of the application of metal oxide films is disclosed in my United States Patents 2,564,-706 and 2,564,707. The film-forming compositions and techniques disclosed therein are applicable to the method of the present invention. However, other film-forming compositions and techniques may be employed.

The substrate body may be of any material which may be readily dissolved from the film. Various water or acid-soluble metals, oxides, glasses or salts may be used for this purpose. For example, halite crystals, cleaved to give a smooth surface, may be used. Fused salts, such as $$KCl\text{-}NaCl$$

eutectic mixture or $BaCl_2\text{-}CaCl_2$ eutectic mixture may be used. Oxides such as ZnO, MgO and $La_2O_3$ have also been found useful for this purpose. It will be understood that the substrate selected should be one which is selectively soluble with respect to the metal oxide film. That is, the substrate should be one which is soluble in the solvent while the oxide film is relatively insoluble. For practical considerations, the substrate should be readily soluble in the solvent so that it may be dissolved in a matter of minutes, with no substantial loss of the oxide film.

The solvent must be one which will preferentially dissolve the substrate with respect to the oxide film. The use of water as a solvent offers the advantage of economy as well as ease of handling. However, other solvents, for example, mineral acid solutions such as hydrochloric acid, sulfuric acid, nitric acid and the like, may be necessary depending on the solubility characteristics of the substrate material and metal oxide film employed. The final choice of solvent will, of course, be dependent on the solubility characteristics of the metal oxide and the substrate material.

A particularly convenient way of supplying the soluble substrate is in the form of a coating or film on a durable base such as a solvent-resistant plastic, glass, ceramic or metal. The soluble substrate then serves as a "parting agent" and the underlying support may be reused. By use of this method, the formation of the soluble substrate surface is simplified and only a minimum amount of substrate material need be used. However, with extremely thin substrate layers, it becomes difficult to introduce solvent between the oxide film and support. Accordingly, it is recommended that substrate layers of this type be at least about 2000 A. thick or solvent attack may be inconventiently slow.

The following examples will serve to further illustrate the invention:

*Example 1*

A series of nickel plates 1 inch square and 0.125 inch thick were coated with a layer of powdered sodium hexametaphosphate and heated in a furnace to about 650° C. at which temperature the phosphate melted to form a smooth viscous glass layer. The temperature was maintained at about 650° C., while a coating solution, comprising a standard solution of 1 gm. $SnCl_4 \cdot 5H_2O$ per ml. of 16% HCl plus 3% HF, was sprayed onto the phosphate glass coated plates by means of an atomizer to form a third order red film of SnO$_2$. After about five minutes, the coated plates were removed from the furnace and immersed in water to dissolve the phosphate glass. The nickel plates were removed and the residue was then soaked in a strong mineral acid for about six hours to remove all foreign matter from the tin oxide. Following this, the residue was again washed in water.

The SnO$_2$ flakes resulting from the above example were approximately 4070 A. in thickness and averaged about 120 microns in diameter.

*Example II*

The procedure of Example I was repeated using a coating solution comprising 1 gm. SnCl$_4$·5H$_2$O per ml. of 19% HCl plus .75% HF and an appropriate atomizer setting to yield a first order red film. The resulting flakes were about 800 A. thick and varied in diameter from about 40 to 200 microns, averaging about 120 microns.

The foregoing examples are intended to be illustrative and not limitative of the present invention. As will be apparent to those skilled in the art, numerous modifications may be employed without departing from the scope of the invention as defined in the appended claims.

What is claimed is:

1. A method for forming thin flakes of the oxides of titanium, indium, tantalum, zirconium, and tin which comprises the steps of:
    (a) contacting a surface of a heated substrate body with a compound which is decomposable by heat to one of said metal oxides thereby forming in situ an iridized film of one of said metal oxides, said substrate body being selectively soluble with respect to said metal oxide;
    (b) separating said substrate body from said metal oxide film by dissolving said substrate body; and
    (c) recovering said metal oxide film in the form of thin flakes.

2. A method according to claim 1 wherein said metal oxide flakes have a thickness of less than 25,000 A.

3. A method according to claim 1 wherein said substrate body consists of a material selected from the group consisting of halite crystals, KCl-NaCl eutectic mixture, BaCl$_2$-CaCl$_2$ eutectic mixture, ZnO, MgO, La$_2$O$_3$ and sodium hexametaphosphate.

4. A method according to claim 1 wherein said substrate body is in the form of a coating or film on a durable base.

5. A method according to claim 4 wherein said substrat body comprises sodium hexametaphosphate.

6. A method according to claim 4 wherein said durable base comprises a solid metal body.

References Cited

UNITED STATES PATENTS

| 491,254 | 2/1893 | Twynam | 23—144 |
| 1,122,340 | 12/1914 | Weber | 23—312 X |
| 1,625,203 | 4/1927 | Glaze | 23—312 X |
| 2,018,633 | 10/1935 | Boller | 264—140 |
| 2,971,867 | 2/1961 | Lytle | 117—211 |

FOREIGN PATENTS

| 203,358 | 1/1911 | Germany. |

OSCAR R. VERTIZ, *Primary Examiner.*

B. H. LEVENSON, *Assistant Examiner.*